(12) United States Patent
Davino

(10) Patent No.: US 6,598,968 B1
(45) Date of Patent: Jul. 29, 2003

(54) 3-DIMENSIONAL MOVIE AND TELEVISION VIEWER

(76) Inventor: Salvatore Davino, 33 S. 7th Ave., LaGrange, IL (US) 60525

( * ) Notice: Subject to any disclaimer, the term of this patent is extended or adjusted under 35 U.S.C. 154(b) by 0 days.

(21) Appl. No.: 10/337,007

(22) Filed: Jan. 6, 2003

(51) Int. Cl.[7] .................................................. G02C 7/12
(52) U.S. Cl. ............................................. 351/49; 351/41
(58) Field of Search ............................ 351/49, 41, 158; 352/86, 43; 349/96; 359/465, 464; 493/346

(56) References Cited

U.S. PATENT DOCUMENTS

| | | | |
|---|---|---|---|
| 4,049,339 A | | 9/1977 | Ledan |
| 4,429,951 A | | 2/1984 | Hirano |
| 4,508,526 A | * | 4/1985 | Dutcher .................. 493/346 |
| 4,597,634 A | | 7/1986 | Steenblik |
| 4,705,371 A | | 11/1987 | Beard |
| 4,717,239 A | | 1/1988 | Steenblik |
| 4,810,057 A | | 3/1989 | Dunkley |
| 5,002,465 A | | 3/1991 | Steenblik |
| 5,144,344 A | | 9/1992 | Takahashi et al. |
| 5,598,231 A | * | 1/1997 | Lin .............................. 351/49 |

* cited by examiner

Primary Examiner—Hung Xuan Dang
(74) Attorney, Agent, or Firm—Philip H. Kier

(57) ABSTRACT

An opaque frame that can be placed in front of a user's eyes like a pair of glasses for 3-D viewing. The frame has two rectangular apertures. These apertures are spaced to be in directly in front of the user's eyes. One aperture is empty; the other opening has plural vertical strips, preferably two, made of polyester film. Between the outer edge of the aperture and the outermost vertical strip is diffractive optical material. The surface of the strips facing away from the person's face might be painted black. Images from a television set or a movie screen appear three dimensional when viewed through the frame with both eyes open.

6 Claims, 1 Drawing Sheet

3-DIMENSIONAL MOVIE AND TELEVISION VIEWER

BACKGROUND

The present invention is a frame placed in front a viewer's eyes for making images from television (TV) sets and movies appear 3-dimensional (3-D).

A number of products and methods have been developed for producing 3-D images from two-dimensional images. Steenblik in U.S. Pat. Nos. 4,597,634, 4,717,239, and 5,002, 364 teaches the use of diffractive optical elements with double prisms, one prism being made of a low-dispersion prism and the second prism being made of a high Some 3-D viewing systems are relatively simple, as is the present invention. Takahaski, et al in U.S. Pat. No. 5,144,344 teach the use of spectacles based on the Pulfrich effect with light filtering lens of different optical densities. Beard in U.S. Pat. No. 4,705,371 teaches the use of gradients of optical densities in going from the center to the periphery of a lens. Hirano in U.S. Pat. No. 4,429,951 teaches the use of spectacles with lenses that can rotate about a vertical axis to create stereoscopic effects. Laden in U.S. Pat. No. 4,049,339 teaches the use of spectacles with opaque temples and an opaque rectangular frame, except for triangular shaped lenses positioned in the frame adjacent to a nosepiece.

SUMMARY

The present invention is an opaque frame that can be placed in front of a user's eyes like a pair of glasses. The frame has two rectangular apertures. These apertures are spaced to be directly in front of the user's eyes. One aperture is empty; the other opening has plural vertical strips made of polyester film. The surface of the strips facing away from the person's face might optionally be painted black. The aperture with the vertical strips contains a diffractive optical material between the outermost vertical strip and the outer edge of the opening. Images from a television set or a movie screen appear three dimensional when viewed through the frame with both eyes open. The present invention provides a simple frame for stereoscopic viewing that is inexpensive to fabricate.

DETAILED DESCRIPTION OF THE INVENTION

Figure 1:
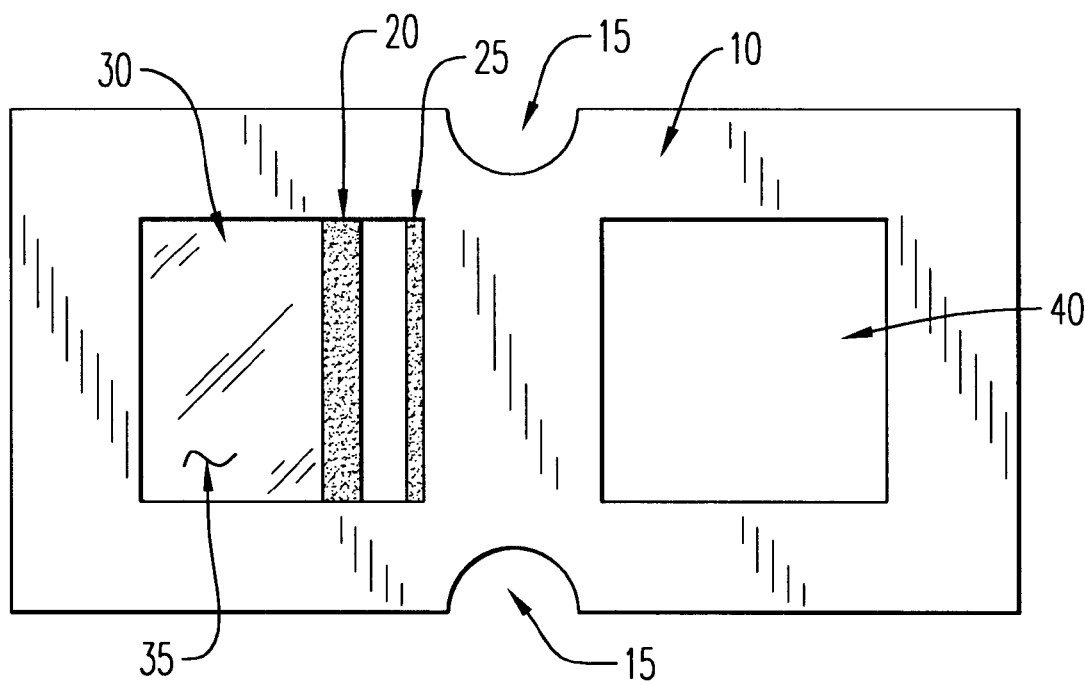
FIG. 1 is a front view of the viewer.

As shown in FIG. 1, the present invention in an opaque, generally rectangular, frame 10 to be held in front of a user's face between the forehead and the nose when viewing television or a movie. The frame may have a central notch 15 on its top surface and its bottom surface so that the frame can rest on the person's nose. The frame has two rectangular apertures spaced so the holes will be in front of the user's eyes. The frame is approximately 14 cm (5.5 in) wide, 7 cm (2.75 in) high, and 0.32 cm (0.125 in) thick. One aperture 40 is empty. The other aperture 30 contains plural vertical strips made of polyester film approximately 0.32 cm (0.125 in) thick. The surfaces of these strips that face away from the user's face might be painted black, preferably with medium black flat paint. In the aperture with the vertical strips, a diffractive optical material is placed in the space 35 between the outermost vertical strip and the outer edge of the aperture. A suitable diffractive material is marketed by Chromatek, Inc. under the C3D trademark for 3-D glasses and is protected by the Steenblik patents identified above.

In the preferred embodiment there are two strips and the apertures are square with dimensions of approximately 3.8 cm. (1.5 in) by 3.8 cm (1.5 in,): One strip 25 is adjacent to the inner surface of aperture 35 and is approximately 0.32 cm (0.125 in). The second strip 20 is approximately 0.79 cm (0.3125 in.) wide and is separated from strip 25 by a distance of approximately 0.95 cm (0.375 in.). By approximately is meant within 0.1 cm of the identified dimension. The inventor has found that with this configuration, a screen viewed through the frame with the left eye appears to be displaced slightly vertically as compared with the image appearing through the frame with the right eye. With both eyes open, this phenomenon results in a three dimensional effect.

What is claimed is:

1. A viewer for making television and movie images appear three-dimensional comprising:
    a rectangular frame containing two apertures;
    plural, vertical strips extending vertically in an aperture; and
    diffractive optical material contained in the aperture with the vertical strips, the diffractive optical material filling the aperture outward from the outermost vertical strip from a user's nose.

2. A viewer as set forth in claim 1 wherein the vertical strips are polyester film.

3. A viewer as set forth in claim 2 further comprising central top and bottom notches, the notches sized for resting the frame on a user's nose.

4. A viewer as set forth in claim 3 wherein there are two vertical strips with the inner strip being adjacent to the inner edge of the aperture.

5. A viewer as set forth in claim 4 wherein the inner vertical strip is approximately 0.32 wide, the outer vertical strip is approximately 0.79 cm wide, and the distance between the inner vertical strip and the outer vertical strip is approximately 0.95 cm wide.

6. A viewer as set forth in claim 4 wherein the surface of the vertical strips directed away from a user's face is black.

* * * * *